US009856924B2

(12) United States Patent
Livingston et al.

(10) Patent No.: US 9,856,924 B2
(45) Date of Patent: Jan. 2, 2018

(54) BIMETAL COIL ASSEMBLY FOR FAN DRIVE

(71) Applicant: BorgWarner Inc., Auburn Hills, MI (US)

(72) Inventors: Ryan W. Livingston, Marshall, MI (US); Jason R. Roderick, Cadillac, MI (US); Darin L. Gwin, Marshall, MI (US)

(73) Assignee: BorgWarner Inc., Auburn Hills, MI (US)

(*) Notice: Subject to any disclaimer, the term of this patent is extended or adjusted under 35 U.S.C. 154(b) by 437 days.

(21) Appl. No.: 14/625,600

(22) Filed: Feb. 18, 2015

(65) Prior Publication Data

US 2016/0238088 A1 Aug. 18, 2016

(51) Int. Cl.
*F16D 35/02* (2006.01)

(52) U.S. Cl.
CPC .......... *F16D 35/023* (2013.01); *F16D 35/021* (2013.01)

(58) Field of Classification Search
None
See application file for complete search history.

(56) References Cited

U.S. PATENT DOCUMENTS 4,116,316 A * 9/1978 Streeter .................. F01P 7/042 192/58.683
4,278,160 A * 7/1981 Hayashi .................. F01P 7/042 192/58.683
4,380,279 A * 4/1983 Masai .................. F16D 35/023 192/58.683
4,505,367 A * 3/1985 Martin .................. F16D 35/022 192/30 V
5,701,985 A * 12/1997 Martin .................. F16D 35/022 192/58.681

* cited by examiner

*Primary Examiner* — Colby M Hansen
(74) *Attorney, Agent, or Firm* — Harness, Dickey & Pierce, P.L.C.; John Artz PC

(57) ABSTRACT

A system and method of anchoring a bimetal coil member on a viscous clutch fan drive. An adjustable channeled retainer member together with a silicone or silicone-type material is used to anchor the free end of the bimetal coil member.

9 Claims, 2 Drawing Sheets

BIMETAL COIL ASSEMBLY FOR FAN DRIVE

TECHNICAL FIELD

The present invention relates to bimetal coil viscous fan drives and more particularly on methods and systems for improving the attachment of the bimetal coil on the fan drive.

BACKGROUND OF THE INVENTION

There are many devices and systems in use today for operating a fan drive to aid in cooling a vehicle engine and/or engine fluids. Viscous fan drives are one of the most popular types in use today. The viscous fan drives can be operated, for example, by a bimetal mechanism, or an electromagnetic mechanism.

Bimetal viscous clutch drives provide an effective and cost efficient way to rotate a cooling fan and cool an engine. Often, however, the positioning and anchoring of bimetal coil members on such fan drives can cause engagement/disengagement repeatability concerns. Varying side loads and friction on the valve shafts connected to the bimetal coils can create repeatability issues.

Thus, there is a need for a method and system for improving the anchoring and anchoring of bimetal coil members on fan drives and thus improving the repeatability of the engagement and disengagement of the fan drives.

SUMMARY OF THE INVENTION

The present invention provides a system and method for satisfying that need. The present invention provides an improved way to position, secure and calibrate a bimetal coil member on a fan drive housing and improve the repeatability of the engagement and disengagement of the fan drive.

An adjustable retainer member on the housing is utilized to position and secure the outer free end of the bimetal coil member. The free end is anchored in place by a curable material, such as silicone. In this manner, the operation of the fan drive can be tested and calibrated, during and after production, and the position of the free end adjusted as needed to insure appropriate engagement and disengagement.

Other features, benefits and advantages of the present invention will become apparent from the following description of the invention in conjunction with the drawings and appended claims.

DESCRIPTION OF PREFERRED EMBODIMENTS

Figure 1:
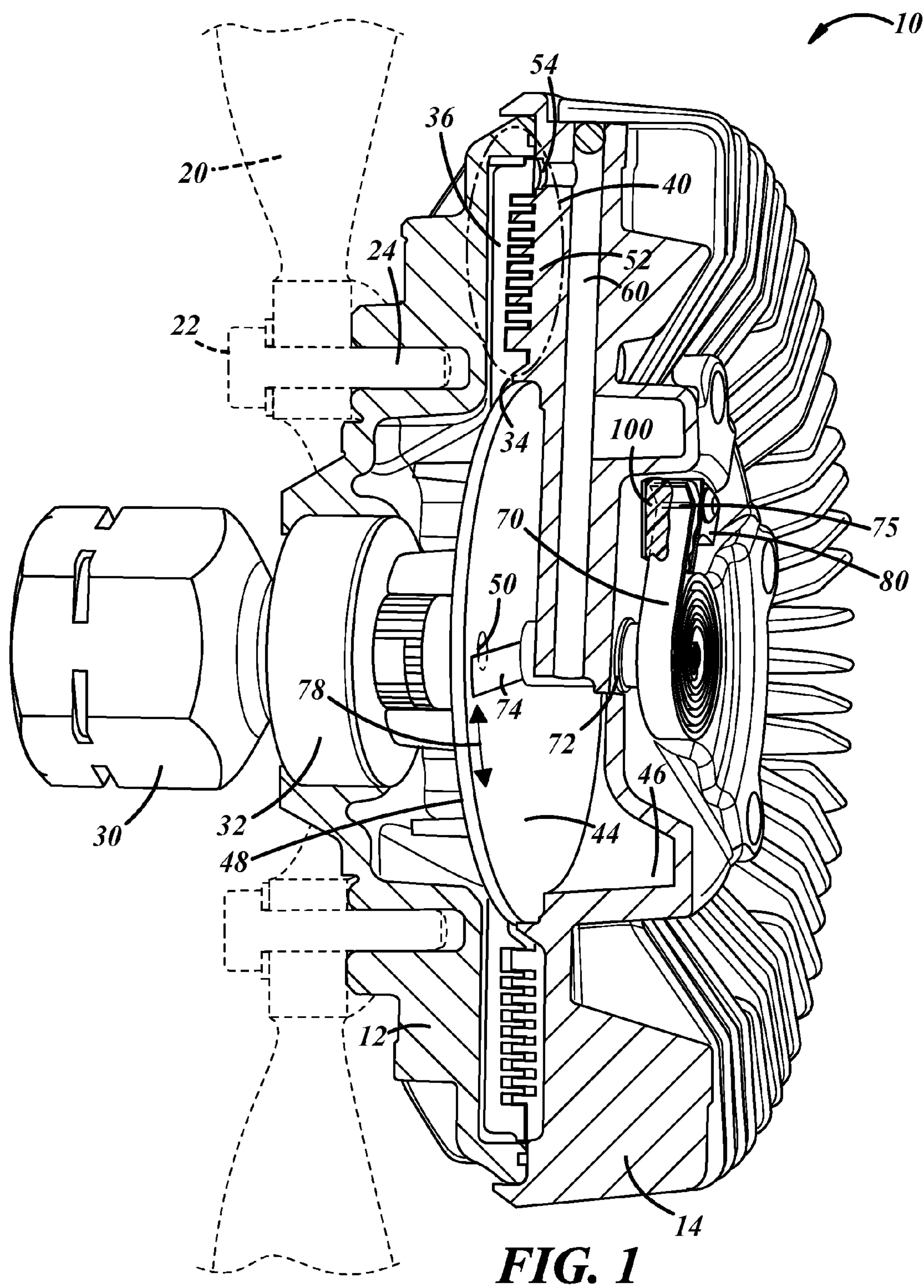
FIG. 1 depicts a bimetal coil viscous fan drive utilizing a preferred embodiment of the present invention.

A bimetal viscous fan drive 10 is shown in FIG. 1. The fan drive includes a body member 12 and a cover member 14 that are affixed securely together to form a housing. A cooling fan 20 (shown in dashed lines) is attached to the body member 12 by fasteners 22, such as bolts, positioned in openings 24. The body member, cover member and cooling fan all rotate at fan speed.

A centrally positioned shaft member 30 is connected to the body member by bushing 32. A clutch disk 34 is fixedly attached to the shaft member. A labyrinth 36 of grooves and lands is positioned on the radially outward portion of the clutch disk. This forms one-half of the viscous clutch mechanism positioned in the working chamber 40. The shaft member 30 is also connected to a pulley member (not shown) which is attached to a belt member operated by a vehicle engine. The shaft member 30, and clutch disk 34 rotate at input speed.

A fluid retainer plate member 44 is positioned in the central cavity between the body member and cover member. The retainer plate member 44 is positioned between a fluid reservoir chamber 46 and a fluid operating chamber 48 and has one or more openings or ports 50 therein for passage of fluid between chambers 46 and 48.

A second labyrinth 52 of grooves and lands is positioned on the inside of the cover member 14. This forms the second half of the viscous clutch mechanism positioned in the working chamber 40.

A wiper member 54 is positioned in the small gap between the outer face of the clutch disk 34 and the opposing face of the internal cavity in the housing. It is typically positioned adjacent to the scavenge hole and typically on the same plane. The wiper member is used to pump out viscous fluid from the working chamber 40 and pass it into the fluid reservoir 46. A scavenge channel (or passageway) 60 in the cover member 14 is utilized to convey the fluid from the working chamber to the fluid reservoir.

Mounted on the front face of the cover member is a bimetal coil member 70. The bimetal coil member is attached by a shaft member 72 to a valve member 74 positioned on the fluid retainer plate member 44. The valve member 74 is positioned adjacent opening 50 in the fluid retainer plate member and is mounted such that it can rotate (as shown by arrow 78) to cover and uncover the opening 50.

During use of the viscous clutch fan drive 10, the bimetal coil member 70 heats up and deforms. This causes the valve member 74 to rotate and uncover or partially uncover the opening 50. The more the temperature increases, the more the valve member 74 uncovers the opening. This causes a direct increase in the speed of the fan, since more of the viscous fluid is retained in the working chamber, and more viscous shear is formed. This causes the rotation of the fan 20 to increase.

In use, the shaft member 72 and valve member 74 can rotate as much as 10°-20°.

Figure 2:
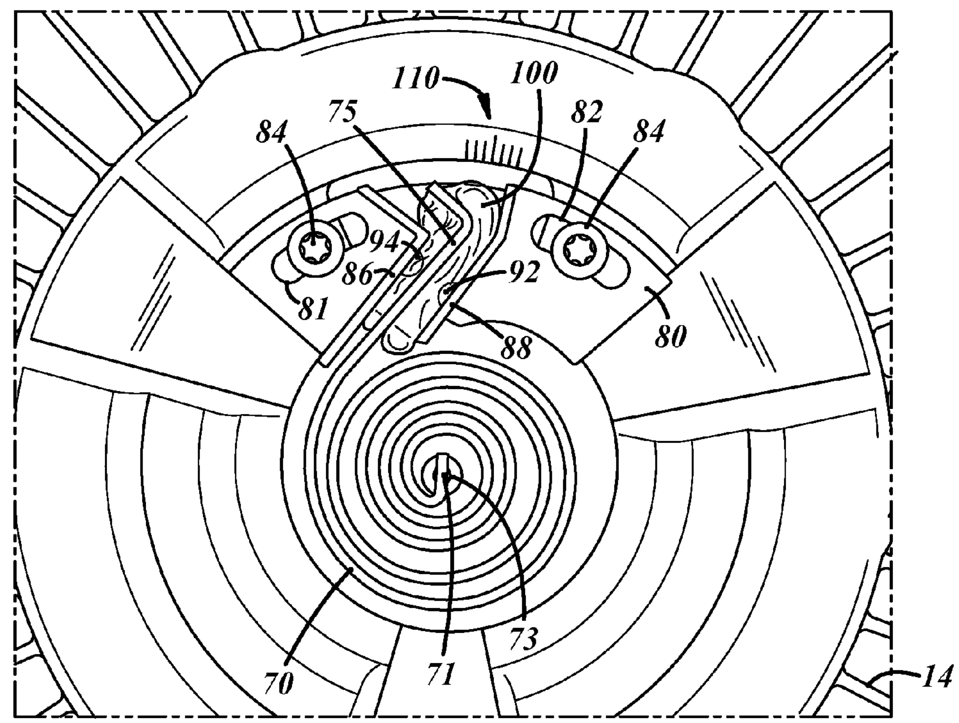
FIG. 2 is a planar view of a bimetal coil viscous fan drive utilizing the present invention.
Figure 3:
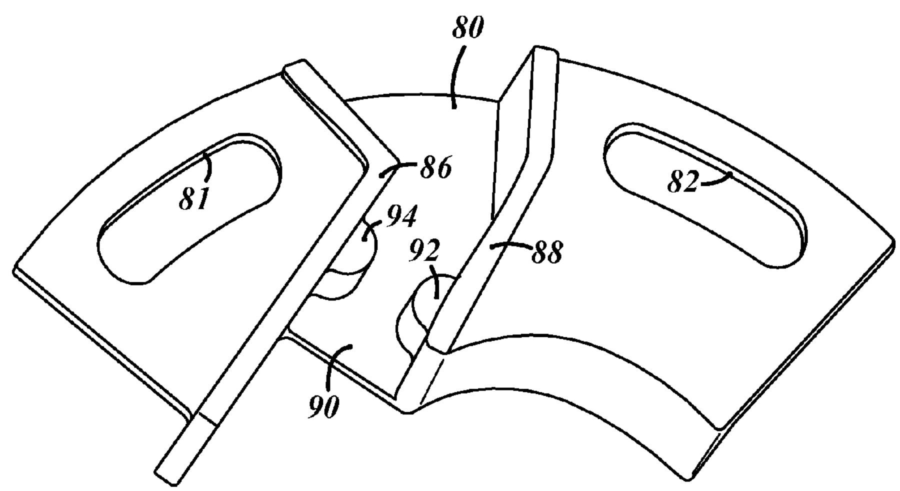
FIG. 3 depicts a preferred embodiment of an adjustable retainer member for use with the present invention.

The bimetal coil member 70 has a circular coil shape, as is typical with conventional bimetal coils. This is shown more clearly in FIG. 2. The center of the coil member 71 is secured directly to the shaft member 72 by a fastener 73 or the like. The opposite end 75 of the bimetal coil member is anchored to the cover member 14. An adjustable retainer member 80 is used for this purpose. The preferred embodiment of retainer member 80 is shown in FIG. 3.

In order for the bimetal viscous clutch fan drive to operate in an optimum manner, the bimetal coil member must be anchored at both ends. This allows the coil members to exert a rotational force on the shaft 72 and operate the valve member 74. Rotation of the shaft member controls the point at which the viscously coupled fan drive engages and disengages, and this depends on the ambient air temperature.

A fixed bimetal coil attachment can cause inconsistency in the fan engagement and disengagement temperature. Varying amounts of side loads on the coil based on its connection to the rotatable shaft member can occur depending on production variability. Stated another way, the resulting varying amount of side loads and friction on the shaft connected to the central end of the bimetal coil can create engagement/disengagement repeatability issues. This, of course, is because the shaft's rotation dictates fan drive response. An unintended shift of only a few degrees in the rotation response can make a bimetal coil viscous fan drive defective.

Simply anchoring the free end of a bimetal coil member in silicone also is not optimal. Once the silicone cures, any further adjustment or calibration during or after production is prevented.

The retainer member 80 has a pair of slots (or "openings") 81 and 82 in which fastener members 84 are positioned. The positions of the openings 81 and 82 allow adjustment of the retainer member on the fan drive housing and hence adjustment of the end 75 of the bimetal coil member 70. Loosening of the fastener members 84 permits lateral adjustment of the position of the retainer member 84 on the housing.

The retainer member also has a pair of raised guide ridge members 86 and 88 forming a channel 90. A pair of nubs or protrusions 92 and 94 are positioned in the channel 90. The guide ridges and nubs are used to center and position the end 75 of the bimetal coil member in the channel 90.

The retainer member 80 is preferably made of a lightweight metallic material, such as aluminum or zinc.

A setting material, preferably a silicone material 100, is applied to the end 75 of the bimetal coil member in the channel 90. The silicone can be positioned in the channel before the coil is positioned on the housing. The silicone material 100 is utilized to hold and anchor the bimetal coil member in place on the cover member. Also, since the silicone material has an extended setting (curing) time, the end of the bimetal coil can be repositioned during calibration as the silicone is cured. Preferably, the silicone is a UV curable silicone material and a UV light is used to cure and set the silicone in place when it is time to do so.

Also, with the present invention, once the silicone has cured, the retainer member 80 can be repositioned in order to further reposition the end of the bimetal coil. This allows the bimetal coil member to be calibrated and finally positioned and anchored after all tests and calibrations are concluded. This ensures that each viscous clutch fan drive is also able to be easily recalibrated as needed to respond at the specific desired temperature.

Once the first calibration testing is completed and the silicone is set, the bimetal fan drive member is retested. At that point, any inconsistencies can be corrected by adjusting the position of the retainer member 80 on the housing. For this purpose, a series of markings 110 can be provided on the retainer member and/or the housing (as shown in FIG. 2). This allows the retainer member to be adjusted one way or another (i.e. left or right) the number of markings corresponding to the amount of calibration is necessary. For example, each marking could be a change of several degree F., such as 5 or 10°.

Materials other than silicone could also be utilized to encapsulate, cover, and anchor the free end of the bimetal coil member, so long as the material has a curing time and adjustment function substantially the same as silicone. Silicone allows the free end to locate itself prior to finish of the curing process.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A viscous fan clutch comprising:

a housing having a plurality of first concentric ribs;

a rotor rotatably disposed in the housing, the rotor having a plurality of second concentric ribs that are juxtaposed with the first concentric ribs, the rotor and the housing cooperating to form a working chamber;

a fluid reservoir that is coupled in fluid communication with a radially inner side of the working chamber;

a valve coupled to the housing, the valve including a valve element that is rotatably disposed in the housing and movable between a first valve element position, which inhibits fluid communication from the fluid reservoir into the working chamber, and a second valve element position that permits fluid communication from the fluid reservoir to the working chamber;

a bimetal coil having a first end, which is rotatably coupled to the valve element, and a second end that is radially outward of the first end;

an adjustable retainer member that is movable about a rotational axis of the rotor relative to the housing through a predetermined angle, the adjustable retainer member defining a first slotted mounting aperture and a channel into which the second end of the bimetal coil is received; and a first threaded fastener received through the first slotted mounting aperture and threadably coupled to the housing.

2. The viscous fan clutch of claim 1, further comprising a cured material disposed in the channel and bonding the second end of the bi-metal coil to the adjustable retainer member.

3. The viscous fan clutch of claim 2, wherein the cured material comprises silicone.

4. The viscous fan clutch of claim 1, wherein the adjustable retainer member defines a second slotted mounting aperture and wherein the viscous fan clutch further comprises a second threaded fastener that is received through the second slotted mounting aperture and threadably coupled to the housing.

5. The viscous fan clutch of claim 1, wherein the adjustable retainer member defines a first projection that is disposed in the channel, the first projection contacting a first surface on the second end of the bimetal coil.

6. The viscous fan clutch of claim 5, wherein the adjustable retainer member defines a second projection that is disposed in the channel, the second projection contacting a second surface on the second end of the bimetal coil that is opposite the first surface.

7. The viscous fan clutch of claim 5, wherein the second end of the bimetal coil comprises a tang and wherein the first projection contacts the second end at a location between the tang and the first end of the bi-metal coil.

8. A viscous fan clutch comprising:

a housing having a plurality of first concentric ribs;

a rotor rotatably disposed in the housing, the rotor having a plurality of second concentric ribs that are juxtaposed with the first concentric ribs, the rotor and the housing cooperating to form a working chamber;

a fluid reservoir that is coupled in fluid communication with a radially inner side of the working chamber;

a valve coupled to the housing, the valve including a valve element that is rotatably disposed in the housing and movable between a first valve element position, which inhibits fluid communication from the fluid reservoir into the working chamber, and a second valve element position that permits fluid communication from the fluid reservoir to the working chamber;

a bimetal coil having a first end, which is rotatably coupled to the valve element, and a second end that is radially outward of the first end; and means for adjustably coupling the second end of the bimetal coil to the housing.

9. The viscous fan clutch of claim 8, further comprising means for securing the second end of the bimetal coil to the means for adjustably coupling the second end of the bimetal coil to the housing.

* * * * *